Sept. 9, 1969  JAMES E. WEBB  3,466,418
ADMINISTRATOR OF THE NATIONAL AERONAUTICS
AND SPACE ADMINISTRATION
DETERMINATION OF SPOT WELD QUALITY
Filed July 6, 1966
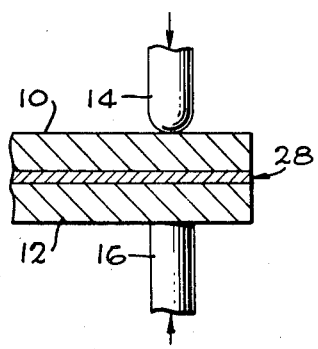
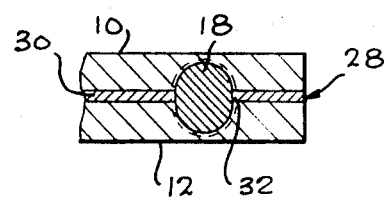
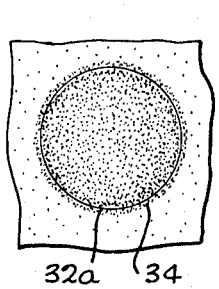
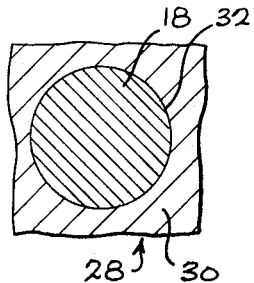
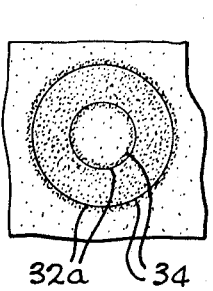
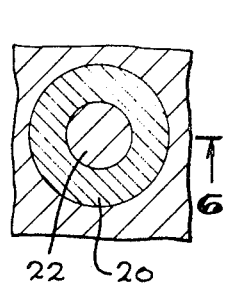
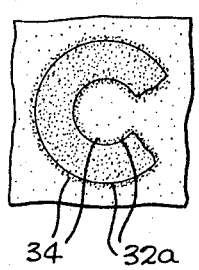
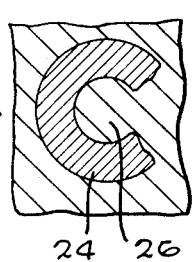
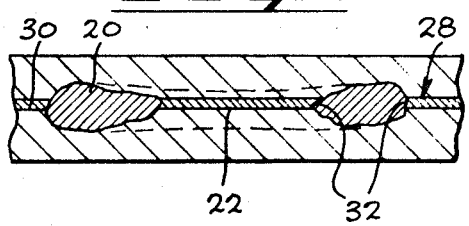
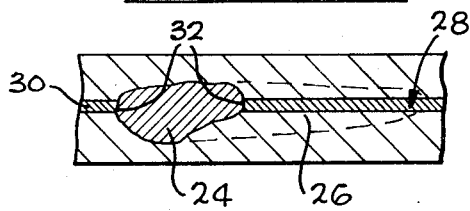
CHARLES J. KROPP
INVENTOR.
BY
Howard B. Scheckman
ATTORNEYS

United States Patent Office 3,466,418
Patented Sept. 9, 1969

3,466,418
DETERMINATION OF SPOT WELD QUALITY
James E. Webb, Administrator of the National Aeronautics and Space Administration with respect to an invention of Charles J. Kropp, San Diego, Calif.
Filed July 6, 1966, Ser. No. 563,644
Int. Cl. B23k 11/10
U.S. Cl. 219—91                                         5 Claims

ABSTRACT OF THE DISCLOSURE

A non-destructive method of radiographically inspecting a resistance weld is disclosed. The method comprises surrounding the desired weld region between work pieces such as stainless steel with a sheet of material having a substantially different radiopacity such as nickel. The pieces are resistance welded to form a nugget containing said material and surrounded by an unfused portion of the sheet forming an interfacial boundary. A radiographic image of the weld region is then formed which includes a line image of said interfacial boundary.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 USC 4257).

BACKGROUND OF THE INVENTION

Field of the invention

This invention relates generally to the welding and weld inspection art. More particularly, the invention relates to a novel resistance welding method which permits or facilitates radiographic inspection of the completed weld, as well as to a novel method of radiographically inspecting resistance welds and a resistance welded work product capable of radiographic weld inspection.

Description of the prior art

According to conventional resistance welding practice, a pair of electrodes are urged against opposite sides of the work members to be joined and a voltage of the proper magnitude for resistance welding is impressed across the electrodes. The resulting current flow between the electrodes produces resistance heating of the members sufficiently to cause fusion of the members in their interfacial region between the electrodes. Several different types of resistance welding methods exist. These methods include spot welding, seam welding, projection welding, flash welding, upset welding, and percussion welding. The present invention is intended primarily for use in spot welding. For this reason, the present disclosure will be devoted to this resistance welding method. As will appear from the ensuing description, however, the invention may be applied to other resistance welding methods.

The fused mass of metal which constitutes the completed resistance or spot weld is commonly referred to as a weld nugget. The ideal spot weld nugget is essentially circular in outline and solid in cross section. Many spot weld nuggets, however, deviate from this ideal shape to such an extent as to be unacceptable for many applications, notably space vehicle applications. Two of the more common aberrated spot weld shapes, for example, are annular or donut and U or horseshoe shapes. An annular or donut shape spot weld has a central unfused region completely surrounded and enclosed by the weld nugget. A U or horseshoe shape weld has a central unfused region which is only partially surrounded by and opens through one side of the weld nugget.

Various methods and means have been devised for inspecting resistance welds to determine their shape and quality. Some of these inspection techniques, such as the existing eddy-current, ultrasonic, and radiographic techniques, are non-destructive in nature and thus permit use of the welded work product after inspection. These non-destructive inspection methods, then, enable determination of the actual shape and quality of the resistance welds which are placed in service. Other weld inspection techniques, such as those which involve sectioning and subsequent microscopic examination of the weld, are destructive in nature and thus do not permit use of the welded work product which is inspected. Accordingly, such destructive weld inspection techniques provide an indication of the probable rather than the actual shape and quality of the welds which are placed in service. The non-destructive inspection techniques are thus most reliable from the standpoint of their ability to indicate the shape and quality of the welds which are placed in service. Moreover, the non-destructive inspection procedures are inherently less tedious and time consuming than the destructive inspection procedures.

As is well known in the art, resistance welds in certain metals are ill-suited to or incapable of inspection by the existing non-destructive techniques. One of these metals is stainless steel. Thus, the only available procedure for reliably inspecting a resistance weld between stainless steel work members involves sectioning and subsequent microscopic examination of the weld nugget. As just noted, this destructive method of weld inspection provides an indication of the probable, rather than the actual, shape and quality of the resistance welds which are placed into service and thus does not possess the high degree of reliability demanded in many applications, notably space vehicle applications.

OBJECTS AND SUMMARY OF THE INVENTION

Accordingly, a definite need exists for an improved and more reliable non-destructive method of inspecting resistance welds in many metals, particularly stainless steel.

It is a general object of this invention to provide such an inspection method, as well as a novel method of resistance welding stainless steel and other metals to permit or facilitate radiographic inspection of the weld and a welded work product capable of radiographic weld inspection.

A more specific object of the invention is to provide a novel resistance welding method and a novel radiographic weld inspection method which involve the placement, between the interfaces of the work members to be joined, of a metal insert or sheet having substantially different radiopacity than the work members, which sheet is fused in the weld region in such a way as to define about the completed weld nugget an interfacial boundary edge that produces a visible X-ray line image conforming to the outline of the nugget.

A further object of the invention is to provide a novel method of resistance welding stainless steel and a novel method of radiographically inspecting resistance welds between stainless steel work members, as well as a resistance welded stainless steel work product capable of radiographic weld inspection.

Yet a further object of the invention is to provide a stainless steel resistance welding method of the character described which produces a weld of superior strength.

Other objects, advantages, and features of the invention will become readily evident as the description proceeds.

BRIEF DESCRIPTION OF DRAWINGS

The invention will now be described in detail by reference to the attached drawings wherein:

FIGURE 1 is a section through a pair of work members about to be joined by the present resistance or spot welding method;

FIGURE 2 is a section through the work members illustrating the completed spot weld;

FIGURE 3a is a radiagraphic image of the spot weld illustrated in FIGURE 2;

FIGURE 3b is a section through the spot weld in FIGURE 2;

FIGURE 4a is a radiographic image of an annular or donut shaped spot weld produced by the present welding method;

FIGURE 4b is a section taken taken through the weld nugget whose radiographic image is represented in FIGURE 4a;

FIGURE 5a is a radiographic image of a U or horseshoe shaped spot weld produced by the present welding method;

FIGURE 5b is a section through the weld nugget whose radiographic image is represented in FIGURE 5a;

FIGURE 6 is an enlarged section taken on lines 6—6 in FIGURE 4b; and

FIGURE 7 is an enlarged section taken on line 7—7 in FIGURE 5b.

Referring now to these drawings, reference numerals 10 and 12 denote a pair of work members to be resistance or spot welded to one another. According to conventional practice, this is accomplished by urging a pair of electrodes 14 and 16 against opposite sides of the members and impressing a sufficient voltage across the electrodes to cause fusion of the work members in their interfacial region between the electrodes. The fused mass 18 of metal which constitutes the completed weld is referred to as a weld nugget. The ideal spot weld nugget is generally circular in outline and solid in cross section, as shown in FIGURE 3b. In many cases, however, spot welding produces weld nuggets having some form of aberration or deformity which renders the welded joints unacceptable for many applications. FIGURES 4b and 6 and FIGURES 5b and 7 illustrate the two more common spot weld aberrations, referred to earlier, which are encountered in actual welding practice. In FIGURES 4b and 6, the deformed weld nugget 20 has a generally annular or donut shape defining an unfused region 22 at the center of the nugget. The deformed weld nugget 24 illustrated in FIGURES 5b and 7 has a generally U or horseshoe shape defining a central unfused region 26 which extends radially through one side of the nugget.

In this disclosure, the work member 10, 12 are assumed to be stainless steel plates. As mentioned earlier, the only currently available procedure for inspecting resistance welds between stainless steel work members involves initial sectioning and subsequent microscopic examination of the weld nugget. Not only is this method of weld inspecton tedious and time consuming, but further, and more important, it results in destruction of the inspected weld and provides only an indication of the probable, rather than the actual, shape and quality of the welds which are placed into service. Accordingly, the inspection method has a comparatively low order of reliability.

The present invention avoids these disadvantages of the existing technique of inspecting resistance welds between stainless steel work members. According to the invention, an insert or sheet 28, in the form of a foil or thin plate having a substantially different radiopacity than the work members, is placed between the interface of the work members 10, 12 to be joined in such a way that the sheet surrounds and extends edgewise beyond the desired weld region, as shown in FIGURE 1. When the work members comprise stainless steel, the preferred material of the insert sheet is nickel. During the actual welding operation, the sheet is fused only in the region of the weld. Accordingly, in the completed weld, the sheet has an unfused portion 30 which surrounds the weld nugget. This unfused portion of the sheet defines, at its juncture with the weld nugget, an interfacial boundary edge 32 which follows the outline of the nugget. It has been found when such a weld is subjected to radiographic examination, the interfacial boundary edge 32 appears, on the radiographic image, as a dark line at the inner periphery of the light halo which is characteristic of X-ray images of stainless steel resistance welds. This line image results from the differing radiopacities of the materials of the work members and insert sheet.

FIGURES 3a, 4a and 5a represent actual radiographic images of the resistance welds illustrated in FIGURES 3b, 4b, and 5b, respectively, wherein the work members are stainless steel and the insert sheet is nickel. In FIGURES 3a, 4a and 5a, the dark line images produced by the interfacial boundary edges 32 of the unfused portions of the nickel sheets 28 employed in the welds is denoted by the reference numeral 32a. In each figure, reference numeral 34 denotes the light halo, just referred to, which is characteristic of X-ray images of stainless steel resistance welds. It will be observed that in each case, the line image 32a follows the outline of the corresponding weld nugget 18, 20, or 24, as the case may be, and thus clearly defines the nugget shape. Accordingly, the present invention permits non-destructive radiographic inspection of resistance welds between stainless steel work members to determine the weld shape and quality. An additional advantage of the invention resides in the fact that fusion of the stainless steel and nickel in the weld nugget produces a welded joint of superior strength.

It is now obvious that the invention may, conceivably, be utilized to advantage in some or all of the different resistance welding methods referred to earlier. It is further obvious that the invention is not limited in application to resistance welding of stainless steel. Thus, the invention may be applied to the resistance welding of any metals by employing an insert sheet having a sufficiently different radiopacity than the work members to produce a readily visible radiographic image of the interfacial boundary edge defined by the unfused portion of the sheet. In this regard, it should be noted that the invention may be employed to enhance or clarify a radiographic image of a weld which normally yields a relatively poorly defined image with conventional radiographic inspection techniques.

Accordingly, the invention herein described and illustrated is fully capable of attaining the several objects and advantages preliminarily set forth.

What is claimed as new in support of Letters Patent is:

1. The non-destructive method of radiographically inspecting a resistance weld between two metal work members which when directly welded form a weld the radiographic image of which is unsuitable for radiographic inspection, which comprises the steps of:

placing between said work members in surrounding relation to the desired weld region a sheet of material having a substantially different radiopacity than the material of said members;

resistance welding said work members to one another within said region in such a way as to fuse said members and sheet within said region, thus to form a weld nugget surrounded by an unfused portion of said sheet defining an interfacial boundary edge which conforms to the outline of said nugget; and forming a radiographic image of said weld region including a line image of said interfacial boundary edge.

2. The welding method according to claim 1 wherein:

the material of said work members comprises stainless steel;

said sheet comprises a nickel foil; and said resistance welding step comprises spot welding said work members within said region.

3. The radiographic weld inspection method according to claim 1 wherein:
   the material of said work members comprises stainless steel; and
   the material of said sheet comprises nickel.
4. The radiographic weld inspection method according to claim 1 wherein:
   the material of said work members comprises stainless steel.
5. The welding method according to claim 4 wherein: said sheet comprises a nickel foil.

References Cited

UNITED STATES PATENTS 2,544,335   3/1951   Linnert _____ 219—91

JOSEPH V. TRUHE, Primary Examiner

L. H. BENDER, Assistant Examiner

U.S. Cl. X.R.

219—109, 117